July 7, 1931.  E. HAUK  1,813,050
MILK COOLER
Filed March 28, 1928
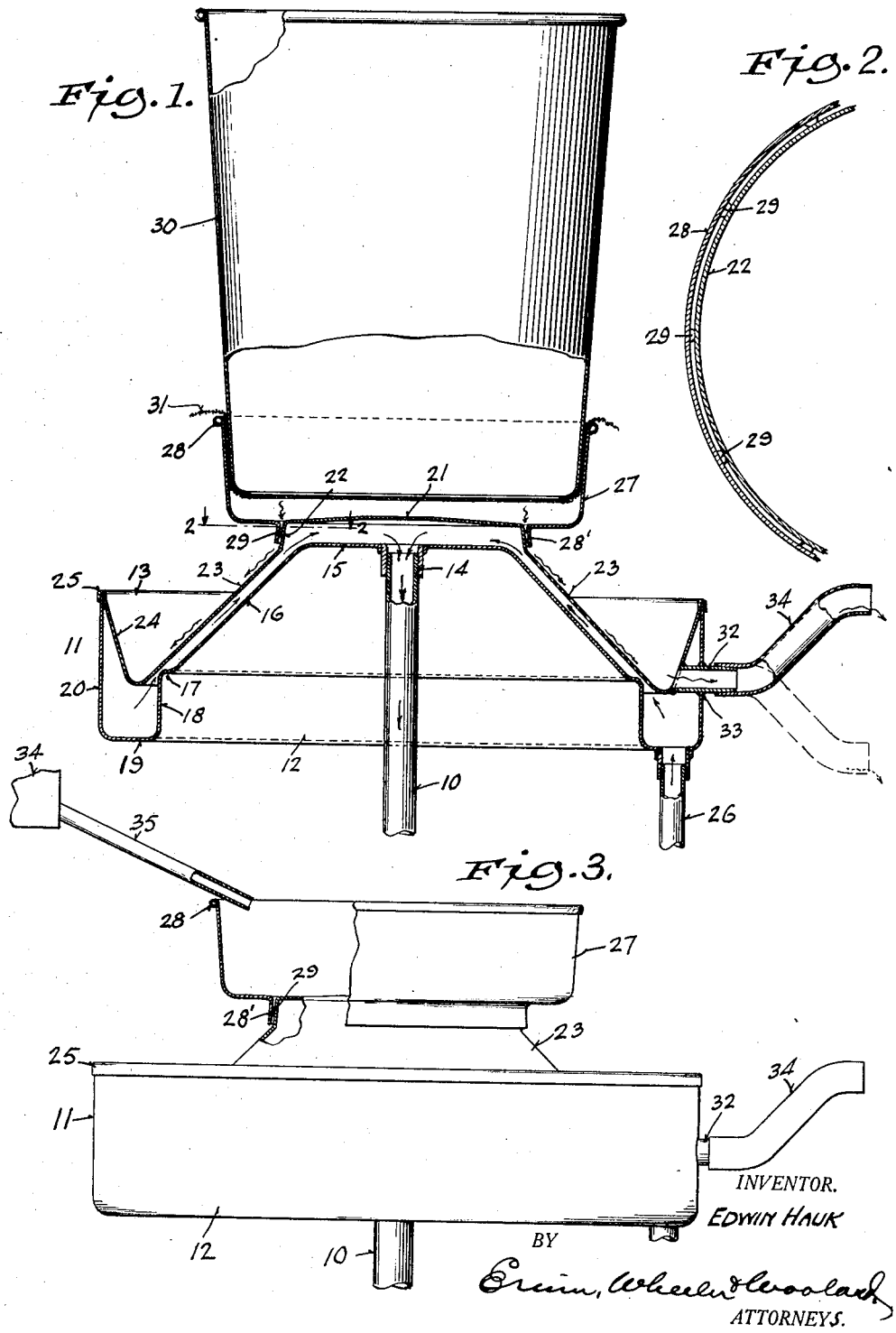
INVENTOR.
EDWIN HAUK
BY
Evans, Wheeler & Woodard
ATTORNEYS.

Patented July 7, 1931

1,813,050

UNITED STATES PATENT OFFICE

EDWIN HAUK, OF MILWAUKEE, WISCONSIN

MILK COOLER

Application filed March 28, 1928. Serial No. 265,410.

The invention relates to a milk cooler of simple and economical construction, very efficient in operation, and easily maintained in sanitary condition by reason of the absence of crevices in which germs may find lodgment.

The cooling element is so constructed as to force a very effective circulation of water through the device, thus insuring that the whole of the milk passing over the cooling surfaces will be reduced to a uniform low temperature.

The structure of the invention will now be described, and the novelty residing in the same will be pointed out in the appended claims.

In the accompanying drawings:

Figure 1 is a sectional view in a central vertical plane, of a structure embodying my invention, with some unimproved parts shown in full lines.

Fig. 2 is a framentary view, enlarged, on the horizontal sectional line 2—2, Fig. 1, showing a feature of construction which will be described later.

Fig. 3 is a view in elevation, partly broken, on the lines of Fig. 1, showing the device when used in connection with a cream separator.

In the drawings, the numeral 10 indicates a tubular standard upon the upper end of which the cooling device 11 is supported. The said cooling device is formed from two sheets of metal, properly shaped by spinning or drawing so as to form a base member 12 and a top member 13. The base member 12 is provided with a centrally located depending boss or bushing 14, adapted to fit closely about the upper end of the tubular standard 10. The sheet from which the base 12 is formed extends outwardly from the central opening, as at 15, and is then turned downwardly, at an angle of about 45°, as at 16, forming substantially a truncated cone. At the base of the latter the sheet is extended radially to form a circular shoulder as at 17, and at the edge of the shoulder the sheet is downturned to form a vertical wall 18. Again the sheet is extended outwardly in a horizontal position as at 19, and then upturned at 20 to form an outer circular wall, the walls 18 and 20, with the bottom 19, defining a circular channel through which the water used in cooling the milk may flow freely.

The top piece 13 of the cooler is likewise pressed or spun from a sheet of metal, and is constructed with a circular central portion 21, and may be slightly bowed from a horizontal plane. At the periphery of the portion 21, the sheet is downturned to form a short circular wall 22, in which there is preferably a slight upward convergence. The sheet is then turned outwardly and downwardly as at 23, at an angle which is about parallel to the sloping surface 16 of the base so as to be concentric therewith, but slightly separated therefrom. Near its lower edge the tapering wall 23 of the top 13 is made to approach very closely to the corner of the circular shoulder 17, so as to provide a narrow circular passage at that location. Passing slightly below the shoulder 17, the sheet is upturned as at 24, and extended outwardly until it meets the top of the wall 20, and so forms an open, circular trough, in which the milk or cream passed through the device is collected after being cooled, and held until conducted away. The upper edges of the circular walls 20 and 24 are seamed to make a fluid tight joint as at 25. This completes the closure of the compartment through which the cooling water is made to flow.

An inlet pipe 26, connected to a supply of flowing water, opens into the channel in the base. The pressure upon the water causes the latter to fill the channel in the base 12, and to flow through the constricted opening and fill the space between the tapering circular wall 16 and 23, until it finds an outlet through the tubular standard 10. The temperature of the water is thus transmitted to the wall 23 and to the milk or cream flowing downwardly thereover, to reduce the temperature of the latter.

The numeral 27 designates a shallow pan of circular form, provided at its top with a reinforcing rib 28, and having a large opening in its bottom, approximating in diameter that of the circular upper portion 21 of the top piece 13. The margin surrounding the opening in the bottom of the pan 27 is downturned so as to form an annular ring 28', the walls of which are substantially parallel to the walls 22 of the top piece 13. It is desirable to space the concentric walls 22 and 28' very slightly, and this is attained by indentations or projections 29, see Fig. 2, which may be formed on either of the circular walls. The space described is for the purpose of permitting the milk or cream to flow downwardly and over the cooling surface 23.

A reservoir 30, which may be in the form of an ordinary pail, has its bottom almost entirely cut away for the purposes of my invention. The lower end of the reservoir 30 is adapted to enter the open mouth of the pan 27, the sides of each being provided with a slight taper. A straining cloth 31 is adapted to be laid over the open mouth of the pan 27, and pressed downwardly thereinto, in the positioning of the reservoir 30, the said cloth being wedged between the tapering walls of the pan 27 and the reservoir. In doing this, the straining cloth 31 is tightly stretched across the bottom of the reservoir 30 and the large opening therein.

The freshly drawn milk is poured into the reservoir 30, and it at once begins to pass through the straining cloth 31, into the bottom of the pan 27. The slightly rounded upper end 21 of the top 13 directs the milk into the narrow concentric space separating the walls 22 and 28', and it trickles down over the water cooled surface 23 and into the trough at the bottom thereof. In such movement over the surface 23, the temperature of the milk is reduced by the abstraction of the heat therefrom. An outlet 32 opens from the trough in which the milk is collected, such outlet passing with a tight joint 33 through the wall 20 of the base 12. The outlet 32 may have any desired further connection, which will conduct the milk to a receiving can, or elsewhere as may be expedient. I have shown as connected to the outlet 32 a simple conducting device 34, formed as a bent pipe which may be rotated about the free end of the outlet into either an overflowing position or a discharging position.

In adapting my improved cooler to use in connection with a cream separator, for cooling the cream separated from the milk, I omit the reservoir 30 and the straining cloth 31. In Fig. 3, the numeral 34 indicates a portion of a cream separator, from which a spout 35 leads directly into the pan 27. In such use, the cooling operation is that previously described.

These straining cloths may be readily sterilized or replaced at little expense. However, the construction of my device is not such as to prevent the use of a fine meshed wire strainer in connection therewith, if desired.

In the construction shown, the water circulates around both sides of the trough, and so acts to increase the cooling operation.

Having thus described my invention, what I claim and desire to secure by Letters Patent of the United States is:

1. A milk or cream cooler, comprising a base section having a conical central portion and a lower circular channel into which water for cooling is admitted, and an attached closed top section having an outer conical portion concentric with that first mentioned, with a restricted opening leading from the channel to the space between the conical portions, whereby the water is made to flow over the whole of the surfaces defining the said space and cool the milk or cream flowing outwardly of the top section, a water supply connection for the channel, and an outlet leading from the space for the water passed through the latter.

2. A milk or cream cooler, comprising a base section including a conical portion and a lower circular channel about the same, and a closing top section also including a conical portion spaced from the first conical portion and over the outer side of which milk or cream to be cooled is adapted to flow, with a circular trough at the lower edge of the top section for collecting the milk or cream, the said trough resting in the said channel, and the said sections together forming a closed compartment for the circulation of cooling water at the sides of the trough, with an inlet and an outlet therefor.

3. A milk or cream cooler, comprising a base section and a closing top section together forming a water circulating compartment, with an inlet thereto and outlet therefrom, the said sections having concentrically spaced conical surfaces and a lower circular channel between and through which the water is adapted to flow and reduce the temperature of the milk or cream flowing downwardly and outwardly of the conical surface of the said closed top section, and a milk or cream collecting trough arranged at the lower edge of the top section and disposed in the said channel, to further cool the milk or cream.

4. A milk or cream cooler constituted as a closed compartment with an inlet and outlet for the circulation of water therethrough, and having the general form of a truncated cone with a circular wall at the top thereof, a milk or cream receiving pan having a cut-out bottom supported on the said circular wall, and means for spacing the pan from its support, whereby milk or cream can trickle from the bottom of the pan past the circular wall and over the external surface of the truncated cone.

In testimony whereof, I have signed my name at Milwaukee, this 3rd day of March, 1928.

EDWIN HAUK.